(12) United States Patent
Watanabe et al.

(10) Patent No.: US 8,079,014 B2
(45) Date of Patent: Dec. 13, 2011

(54) SOFTWARE DEVELOPMENT APPARATUS AND METHOD

(75) Inventors: Manabu Watanabe, Kawasaki (JP); Yutaka Nakano, Kanagawa (JP); Kenji Ueda, Kanagawa (JP); Mitsuharu Kurashige, Kanagawa (JP); Yasushi Hasegawa, Kanagawa (JP); Hiroyuki Morozumi, Kanagawa (JP); Sueki Itoyama, Kanagawa (JP)

(73) Assignee: Fujitsu Semiconductor Limited, Yokohama (JP)

( * ) Notice: Subject to any disclaimer, the term of this patent is extended or adjusted under 35 U.S.C. 154(b) by 987 days.

(21) Appl. No.: 11/822,728

(22) Filed: Jul. 9, 2007

(65) Prior Publication Data

US 2008/0010493 A1    Jan. 10, 2008

(30) Foreign Application Priority Data

Jul. 7, 2006   (JP) .................. 2006-188630

(51) Int. Cl.
*G06F 9/44* (2006.01)
(52) U.S. Cl. ..................................... 717/100
(58) Field of Classification Search .......... 717/100
See application file for complete search history.

(56) References Cited

U.S. PATENT DOCUMENTS

| | | | | |
|---|---|---|---|---|
| 5,857,212 | A * | 1/1999 | Van De Vanter | 717/111 |
| 6,990,657 | B2 * | 1/2006 | Hunter et al. | 717/129 |
| 2002/0100021 | A1 * | 7/2002 | Hunter et al. | 717/124 |
| 2003/0023627 | A1 * | 1/2003 | Kerr | 707/507 |
| 2004/0034541 | A1 * | 2/2004 | Caban | 705/1 |
| 2005/0219253 | A1 * | 10/2005 | Piazza et al. | 345/557 |
| 2010/0053177 | A1 * | 3/2010 | Diard et al. | 345/502 |

FOREIGN PATENT DOCUMENTS

| | | |
|---|---|---|
| JP | 61-243533 | 10/1986 |
| JP | 5-81221 | 4/1993 |
| JP | 2002288003 A * | 10/2002 |

OTHER PUBLICATIONS

Patent Abstract of Japan, Japanese Application No. 2001-216139 published Aug. 10, 2001 (1 page).
Patent Abstracts of Japan, Published Application No. 09-212352, Published Aug. 15, 1997.
Patent Abstracts of Japan, Published Application No. 2001-216139, Published Aug. 10, 2001.
Patent Abstracts of Japan, Published Application No. 2001-331465, Published Nov. 30, 2001.
Patent Abstracts of Japan, Published Application No. 10-255067, Published Sep. 25, 1998.
Patent Abstracts of Japan, Published Application No. 07-311743, Published Nov. 28, 1995.
Patent Abstracts of Japan, Publication No. 05-081221, Published Apr. 2, 1993.
Patent Abstracts of Japan, Publication No. 61-243533, Published Oct. 29, 1986.
Japanese Patent Office Action dated Oct. 11, 2011 in Japanese Patent Application No. 2006-188630.

* cited by examiner

*Primary Examiner* — Wei Zhen
*Assistant Examiner* — Junchun Wu
(74) *Attorney, Agent, or Firm* — Staas & Halsey LLP

(57) ABSTRACT

A software development apparatus capable of mitigating troublesomeness involved in the development of software to be executed by a multi-core processor. A processor core identifier identifies one of processor cores with which software development information (project information, program development support information, debugging information, etc.) for developing software is associated. In accordance with the identification result, a display processor displays the association between the software development information and the corresponding processor core in a visually distinguishable manner.

7 Claims, 19 Drawing Sheets

| Core | Address | Data |
|---|---|---|
| 1 | 0x8093 | 80 A0 18 00 07 0E F8 00 00 |
| 1 | 0x809C | 8E F4 80 A8 88 0D 84 11 88 |
| 1 | 0x80A5 | 0D 01 87 00 0C 64 C5 80 3B |
| ⋮ | ⋮ | ⋮ |

FIG. 10

| Core | Address | Source | Line |
|------|---------|--------|------|
| 1 | 0x8093 | a.asm | 223 |
| 1 | 0x808C | a.asm | 333 |
| 1 | 0x80A5 | a.asm | 444 |

FIG. 13

| Core | Function | Call count | Usage rate |
|---|---|---|---|
| 1 | func11() | 11 | 82% |
| 1 | func12() | 8 | 16% |
| 1 | func13() | 4 | 1% |
| 1 | func14() | 3 | 1% |

FIG. 16

| ID | Entry | Status wait request | Extension info | Priority |
|---|---|---|---|---|
| 1(S0) | RMP_TSK | TTS_WA... | H00000000 | 1 |
| 2(S0) | tsk1 | TTS_WA... | H00000000 | 1023 |
| 3(S0) | tsk2 | TTS_RUN... | H00000000 | 1024 |
| 1(S1) | RMP_TSK | TTS_WA... | H00000000 | 1 |
| 2(S1) | tsk1 | TTS_WA... | H00000000 | 1023 |
| 3(S1) | tsk2 | TTS_RUN... | H00000000 | 1024 |

FIG. 19

SOFTWARE DEVELOPMENT APPARATUS AND METHOD

CROSS-REFERENCE TO RELATED APPLICATIONS

This application is based upon and claims the benefits of priority from the prior Japanese Patent Application No. 2006-188630, filed on Jul. 7, 2006, the entire contents of which are incorporated herein by reference.

BACKGROUND OF THE INVENTION

1. Field of the Invention

The present invention relates to software development apparatus and methods, and more particularly, to an apparatus and method for developing software to be executed by a multi-core processor.

2. Description of the Related Art

As a means of software development, a project management method has been known in which the dependence relations among source programs or among the functions in a program are managed under a project (see, e.g., Unexamined Japanese Patent Publication No. H09-212352 and Japanese Patent No. 3603718).

Project management is also used in the development of software for a multi-core processor in such a manner that the software developer is allowed to develop such software while looking up software development information displayed on the computer display, such as project information, source programs describing specific processes to be executed by respective processor cores, program development support information relating to such processes, and debugging information.

Meanwhile, Unexamined Japanese Patent Publication No. 2001-331465 discloses a technique whereby debugging information related to the operation state of a plurality of programs constituting a multi-process program is displayed in a distinctive manner so as to keep pace with the operation of the program.

With the conventional techniques, however, it is difficult for the software developer to determine with which processor core certain software development information is associated.

Consequently, it is very likely that the software development information associated with a specific processor core will be mistaken for the information associated with a different processor core, giving rise to a problem that a wrong source program is modified by mistake.

SUMMARY OF THE INVENTION

The present invention was created in view of the above circumstances, and an object thereof is to provide a software development apparatus capable of mitigating troublesomeness involved in the development of software to be executed by a multi-core processor.

Another object of the present invention is to provide a software development method capable of mitigating troublesomeness involved in the development of software to be executed by a multi-core processor.

To achieve the first object, there is provided a software development apparatus for developing software to be executed by a multi-core processor. The software development apparatus comprises a processor core identifier for identifying one of processor cores with which software development information for developing the software is associated, and a display processor for displaying, in accordance with an identification result, association between the software development information and the corresponding processor core in a visually distinguishable manner.

Also, to achieve the second object, there is provided a software development method for developing software to be executed by a multi-core processor. The software development method comprises the step, executed by a processor core identifier, of identifying one of processor cores with which software development information for developing the software is associated, and the step, executed by a display processor, of displaying, in accordance with an identification result, association between the software development information and the corresponding processor core in a visually distinguishable manner.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 10 exemplifies an address table for a core 1.

FIG. 13 exemplifies registered breakpoints.

FIG. 16 exemplifies sampler measurement results.

FIG. 19 shows an example of how task analysis results are displayed.

DESCRIPTION OF THE PREFERRED EMBODIMENTS

Preferred embodiments of the present invention will be described in detail below with reference to the accompanying drawings.

Figure 1:
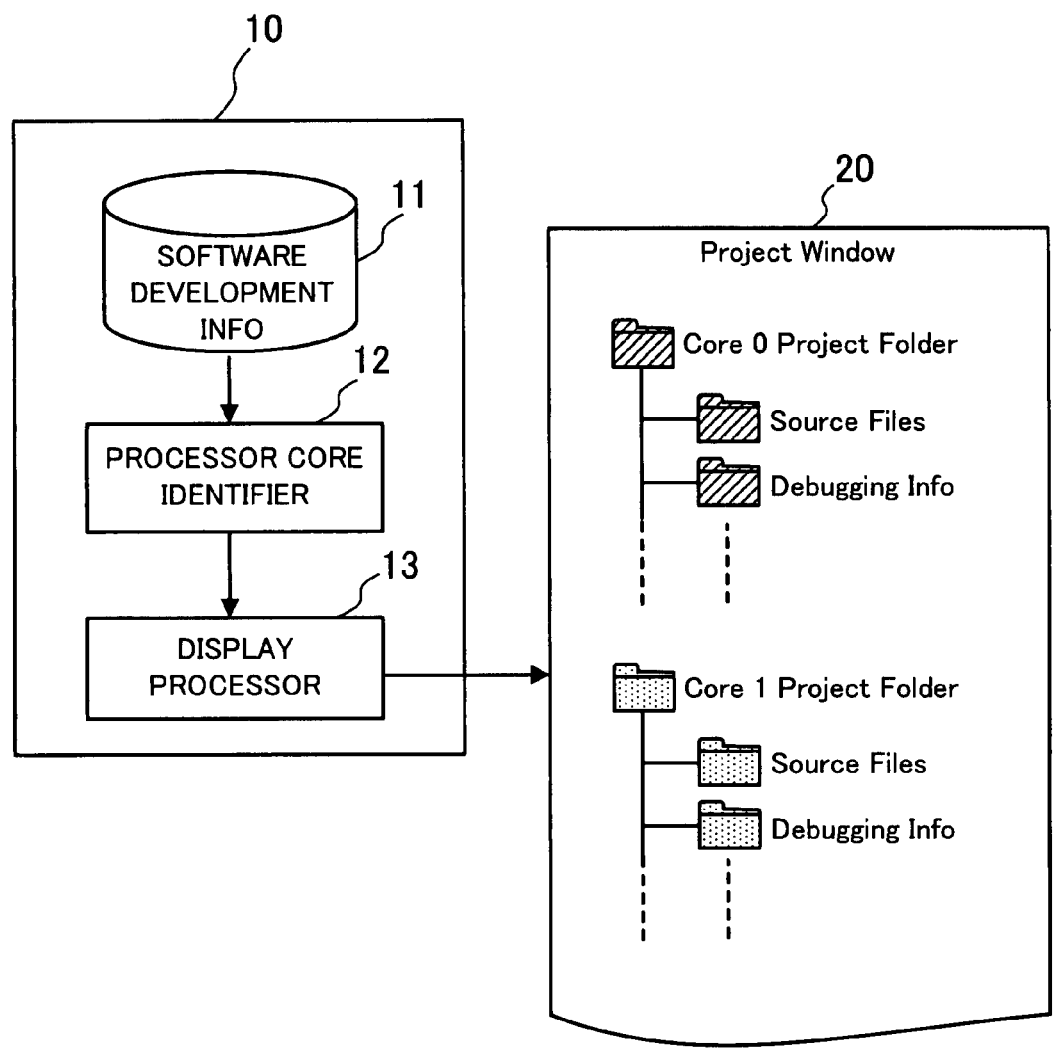
FIG. 1 schematically shows a software development apparatus according to one embodiment of the invention.

FIG. 1 schematically shows a software development apparatus according to one embodiment of the invention. The software development apparatus 10 comprises a processor core identifier 12 for identifying one of processor cores (hereinafter merely referred to as cores as the case may be) with which software development information 11 is associated, and a display processor 13.

The software development information 11 includes project information, source programs, program development support information and debugging information relating to processes described in the source programs.

The program development support information includes execution control information such as debugging breakpoint information or debugging watch point information, build option information, performance information, and object (task) information. The debugging information includes memory window information, register window information, symbol window information, and stack frame window information.

The processor core identifier 12 identifies the core with which each of the aforementioned items of the software development information 11 is associated, as described in detail later.

In accordance with the identification result, the display processor 13 displays the association between the software development information 11 and the corresponding core in a manner visually distinguishable for the user (software developer).

In FIG. 1, project information is shown as the software development information 11, by way of example. As illustrated in FIG. 1, the project information is shown, for example, in a GUI (Graphical User Interface)-based project window 20 displayed on a computer display. Where there are two cores 0 and 1, for example, a core 0 project folder and a core 1 project folder are displayed as the project information in accordance with the results of the identification by the processor core identifier 12 in a manner such that the two folders are easily distinguishable with the eye. Specifically, separate folders are automatically created for the respective cores, and the core 0 project folder is shown in red while the core 1 project folder is shown in green, for example. Source programs and debugging information are also managed under the respective core projects, and their files are shown in the same colors as their corresponding cores 0 and 1.

In this manner, a processor core with which the software development information is associated is identified, and in accordance with the identification result, the association between the software development information 11 and the corresponding core is displayed in a visually distinguishable manner. Accordingly, the user can easily determine the core with which the currently handled software development information is associated, whereby troublesomeness involved in the development of software to be executed by a multi-core processor can be significantly lessened.

The embodiment of the invention will be now described in more detail.

Figure 2:
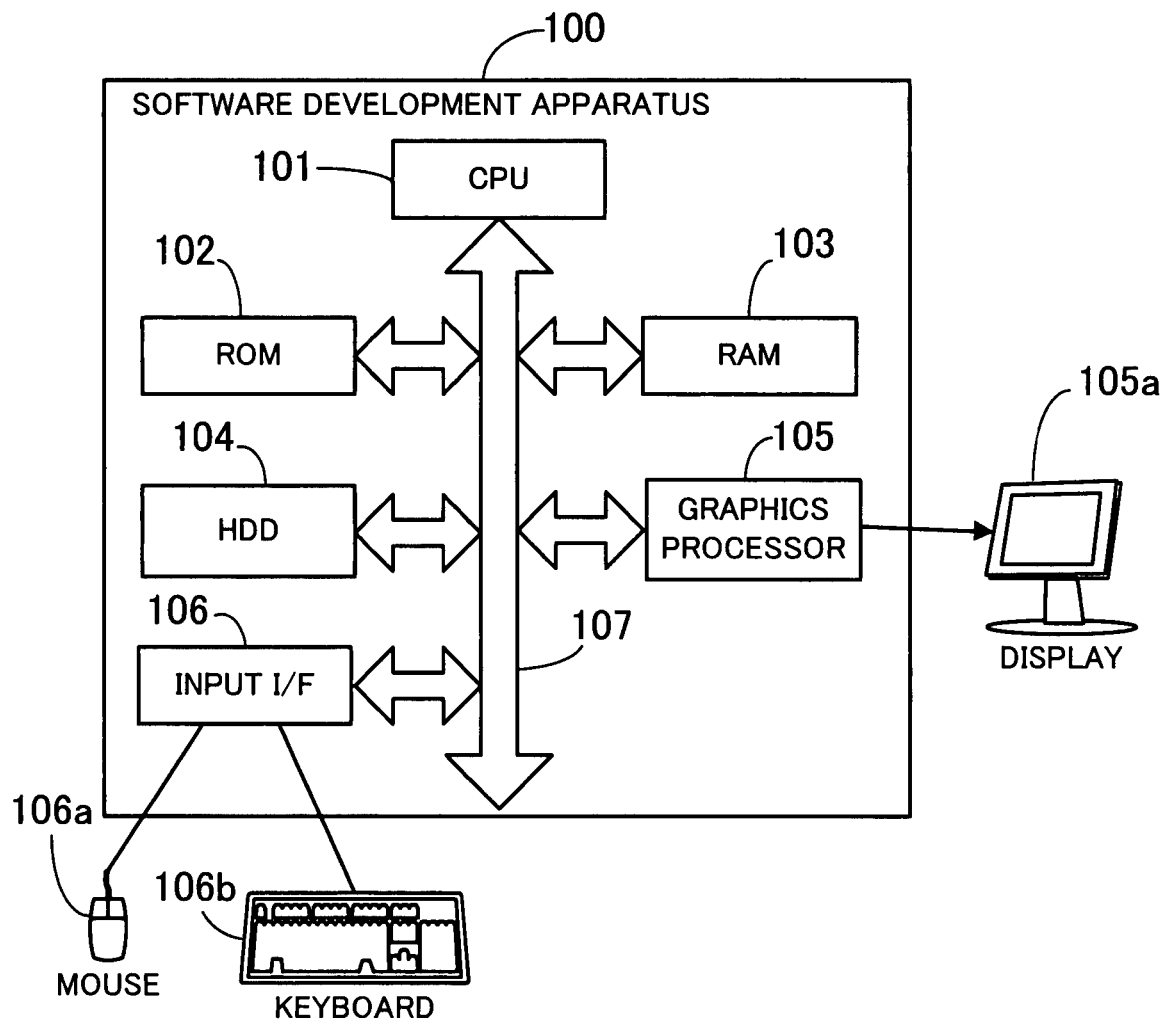
FIG. 2 exemplifies a specific hardware configuration of the software development apparatus according to the embodiment.

FIG. 2 exemplifies a specific hardware configuration of the software development apparatus according to the embodiment.

The software development apparatus 100 comprises, for example, a CPU (Central Processing Unit) 101, a ROM (Read Only Memory) 102, a RAM (Random Access Memory) 103, an HDD (Hard Disk Drive) 104, a graphics processor 105, and an input interface (I/F) 106, which are interconnected by a bus 107.

The CPU 101 controls the individual elements including the graphics processor 105 in accordance with programs and various data stored in the ROM 102 and the HDD 104 so that the processor core identifier 12 and the display processor 13 shown in FIG. 1 may be implemented.

The ROM 102 stores basic programs executed by the CPU 101 as well as data.

The RAM 103 stores programs being executed by the CPU 101 and data derived in the middle of operations.

The HDD 104 stores an OS (Operating System), a program for developing software, and various other application programs, all executed by the CPU 101, in addition to various data.

The graphics processor 105 is connected, for example, with a display 105a as a display device. In accordance with drawing instructions from the CPU 101, the graphics processor 105 displays GUI-based software development screens, such as the project window 20 shown in FIG. 1, on the display 105a.

The input interface 106 is connected with input devices, such as a mouse 106a and a keyboard 106b, and sends information input by the user, such as a software developer, to the CPU 101 via the bus 107.

The following describes exemplary functional blocks necessary for the development of software and implemented by the aforementioned hardware configuration.

Figure 3:
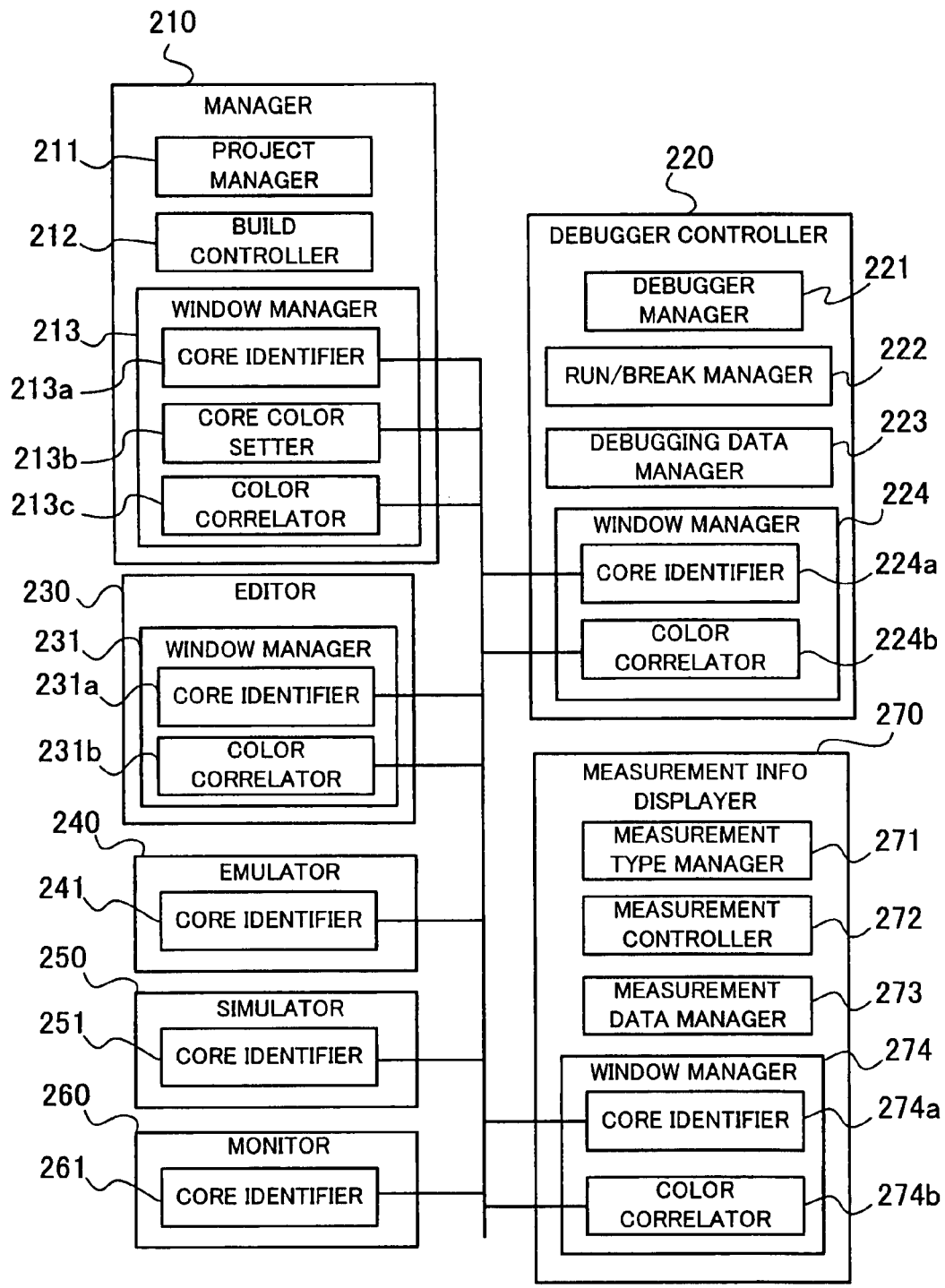
FIG. 3 is a functional block diagram showing functions necessary for developing software.

FIG. 3 is a functional block diagram illustrating the functions necessary for developing software.

The functions include, as a software development environment, a manager 210, a debugger controller 220, an editor 230, an emulator 240, a simulator 250, a monitor 260, and a measurement information displayer 270, for example. These functional blocks are prepared as DLLs (Dynamic Link Libraries), for example, and their processes are executed whenever necessary as the software development program calls the respective libraries. Alternatively, all the functional blocks may be incorporated in and implemented by a single program.

The manager 210 has a project manager 211, a build controller 212, and a window manager 213.

The project manager 211 correlates project information and source programs.

The build controller 212 controls options and translation tools such as a compiler at the time of building.

The window manager 213 makes settings of the project window and includes a core identifier 213a, a core color setter 213b, and a color correlator 213c.

The core identifier 213a identifies the core with which specific project information or source program is associated.

The core color setter 213b sets different colors (hereinafter referred to as core colors) for the respective cores. In the case of developing software for a multi-core processor with two cores, for example, the core colors are set such that red and green are assigned to the cores 0 and 1, respectively.

After the core associated with the project information (folder etc.) is identified, the color correlator 213c correlates the core color set by the core color setter 213b with the project information. Then, the color correlator 213c causes the graphics processor 105 in FIG. 2 to show, on the display 105a, the project information associated with the specific core by using the correlated core color.

Information about the cores identified by the core identifier 213a and information about the core colors set by the core color setter 213b are shared by the other functional blocks during the execution of the program.

The debugger controller 220 includes a debugger manager 221, a run/break manager 222, a debugging data manager 223, and a window manager 224.

The debugger manager 221 manages debuggers such as the emulator 240, the simulator 250, and the monitor 260.

The run/break manager 222 controls the execution and break (interruption) of the debuggers.

The debugging data manager 223 manages, with respect to each core, information (memory, register, stack, trace, etc.) necessary for debugging.

The window manager 224 makes settings of a debugging information display window and includes a core identifier 224a and a color correlator 224b.

The core identifier 224a identifies the core with which specific debugging data or breakpoint information is associated.

After the core associated with the specific debugging data or breakpoint information is identified, the color correlator 224b correlates the core color set by the core color setter 213b of the manager 210 with the debugging data. Then, the color correlator 224b causes the graphics processor 105 in FIG. 2 to show, on the display 105a, the debugging data associated with the specific core by using the correlated core color. For example, the frame of the debugging data display window is shown in the correlated core color.

The editor 230 edits a source program etc. in response to the input signal from the mouse 106a or the keyboard 106b shown in FIG. 2, and includes a window manager 231 for making settings of an editing window. The window manager 231 has a core identifier 231a and a color correlator 231b.

The core identifier 231a identifies the core with which edit data (e.g., source program) is associated.

After the core associated with the edit data is identified, the color correlator 231b correlates the core color set by the core color setter 213b of the manager 210 with the edit data. Then, the color correlator 231b causes the graphics processor 105 in FIG. 2 to show, on the display 105a, the edit data associated with the specific core by using the correlated core color. For example, the frame of the source program editing window is shown using the correlated core color.

The emulator 240, the simulator 250 and the monitor 260, which are debuggers and one of which is selected under the control of the debugger controller 220, load and debug a built target program. When the emulator 240 is used, the software development apparatus 100 shown in FIG. 2 is connected with an ICE (In Circuit Emulator), for example, to carry out debugging by means of the ICE.

Also, the emulator 240, the simulator 250 and the monitor 260 have core identifiers 241, 251 and 261, respectively, for identifying the core with which the target program is associated.

The measurement information displayer 270 includes a measurement type manager 271, a measurement controller 272, a measurement data manager 273, and a window manager 274.

The measurement type manager 271 selects a measurer, such as a profiler, a sampler, a coverage, a PA (Performance Analyzer) or an OS analyzer, for obtaining performance information or task information, which is program development support information. Such information is acquired using the emulator 240 or the simulator 250.

The measurement controller 272 manages measurement interval information such as the start and end positions of measurement.

The measurement data manager 273 manages measurement data obtained by the emulator 240 and the simulator 250 with the use of the profiler, the sampler, the coverage and the PA.

The window manager 274 displays the obtained performance/task information in a manner such that the software developer can visually distinguish the information associated with one core from the information associated with another. To this end, the window manager 274 includes a core identifier 274a and a color correlator 274b.

The core identifier 274a identifies the core with which the performance/task information obtained by the measurement is associated.

After the core associated with the performance/task information is identified, the color correlator 274b correlates the core color set by the core color setter 213b of the manager 210 with the performance/task information. Then, the color correlator 274b causes the graphics processor 105 in FIG. 2 to show, on the display 105a, the performance/task information associated with the specific core by using the correlated core color. For example, the frame of the window is shown using the correlated core color, or the performance/task information is shown using the corresponding core color.

In the example shown in FIG. 3, the core color setter 213b is included in the manager 210 but may be included in the debugger controller 220, or in the measurement information displayer 270, or in each debugger. In any case, the cores should preferably be correlated with respective different colors.

Also, although the core identifiers 213a, 224a, 231a, 241, 251, 261 and 274a are included in the respective functional blocks, only one core identifier may be provided. In this case, information about the identified cores is shared by the functional blocks.

The operation of the software development apparatus 100 according to the embodiment will be now described.

The following describes the case of developing software for a multi-core processor with two cores, by way of example, and the number of cores is of course not limited to two.

Figure 4:
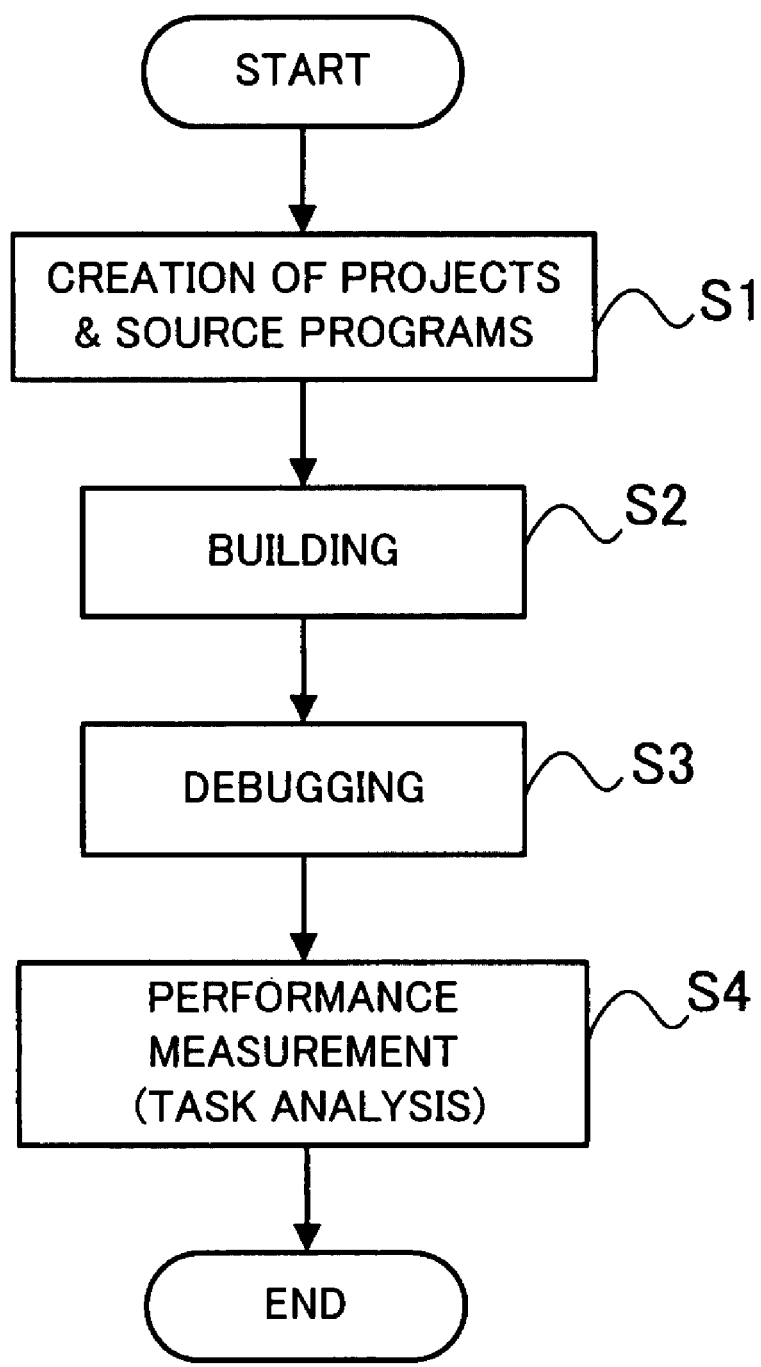
FIG. 4 is a flowchart showing a general procedure for software development.

FIG. 4 is a flowchart showing a general procedure for software development.

When developing software, first, projects and source programs therefor are created (Step S1). Subsequently, the programs are built to create target files for the respective cores (Step S2). The target files are then debugged using debuggers (Step S3). Finally, performance is measured or task analysis is performed (Step S4).

In the following, details of Steps S1 to S4 will be explained.

Figure 5:
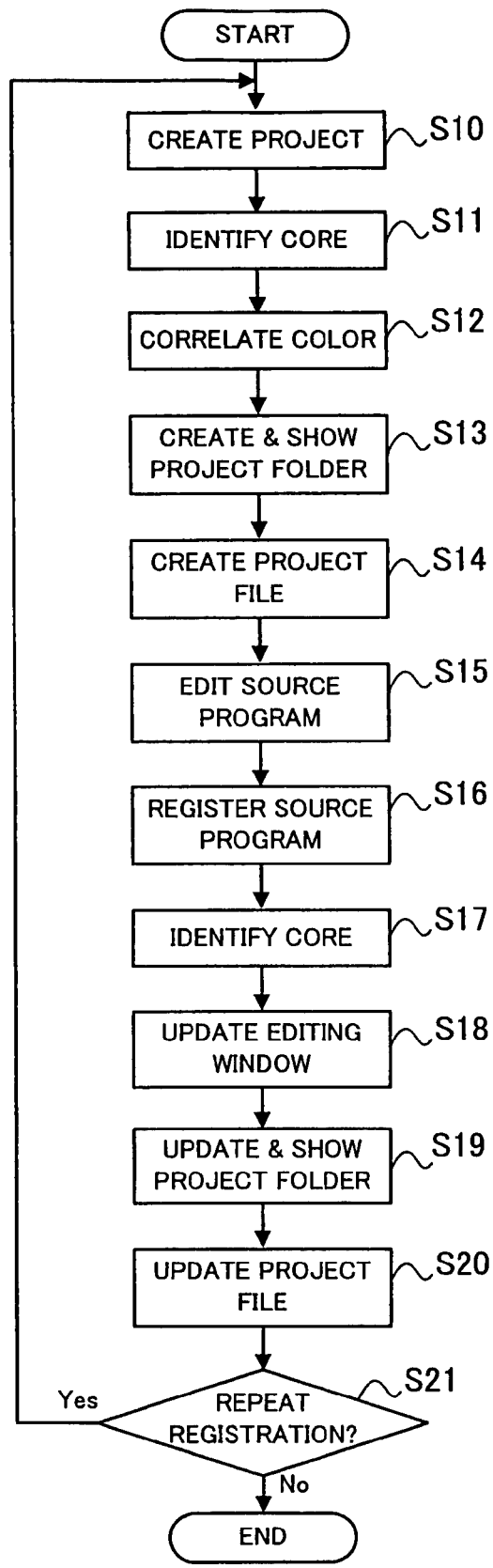
FIG. 5 is a flowchart showing a process for creating projects and source programs.

FIG. 5 is a flowchart showing the process of creating projects and source programs.

First, a new project is created (Step S10).

Figure 6:
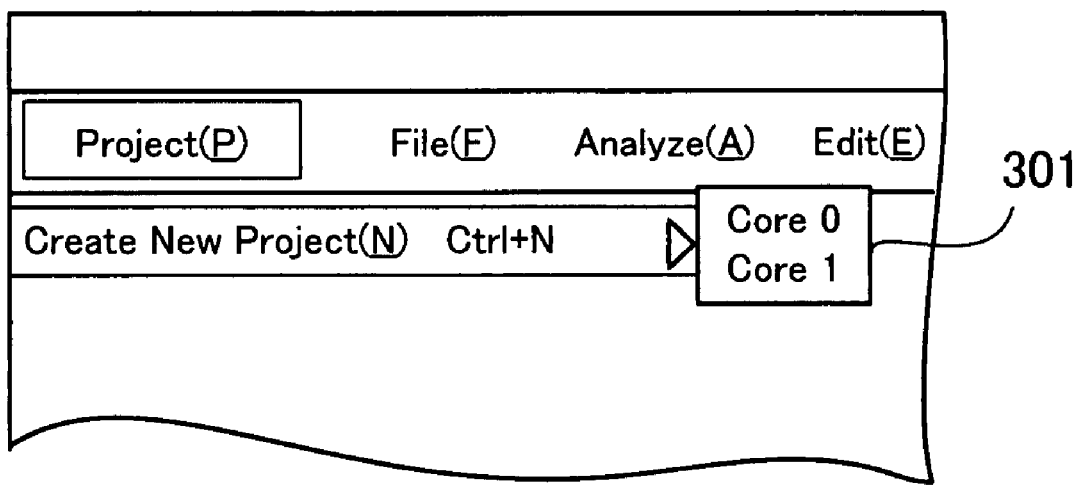
FIG. 6 shows a project creation screen.

FIG. 6 shows a project creation screen.

Under the control of the CPU 101, the graphics processor 105 displays a GUI-based project creation screen on the display 105a. When the user makes a selection to create a new project, the graphics processor 105 displays, under the control of the CPU 101, a core selection window 301, as illustrated, which allows the user to select the core 0 or 1 for which a new project is to be created. The user selects one of the cores.

After the project is created, the core identifier 213a of the manager 210 identifies the core selected by the user (Step S11).

Following the identification of the core associated with the project, the color correlator 213c correlates the core color set by the core color setter 213b with the project information (Step S12). In the following, it is assumed that red and green are set as the core colors of the cores 0 and 1, respectively.

After the project information and the core color are correlated with each other, a core-based project folder with the correlated core color is created and shown in the project window (see FIG. 1) displayed on the display 105a (Step S13).

Subsequently, a project file is created (Step S14), and a source program to be added to the project is edited (Step S15).

After the source program is edited, the edited program is registered under the project (Step S16). At this time, the window manager 231 of the editor 230 shows a core selection window described below, for example, on the editing window.

Figure 7:
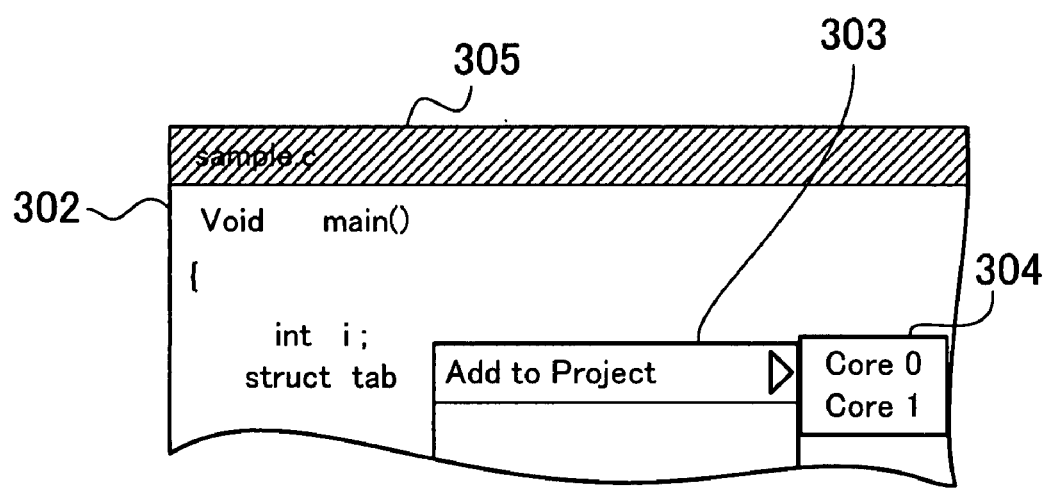
FIG. 7 shows a source program editing window.

FIG. 7 shows the source program editing window.

On completing the editing of the source program on the editing window 302, the user right-clicks the mouse 106a, for example, with the mouse cursor placed on the editing window 302, whereupon a selection window 303 for adding the source program to a project is displayed. When "Add to Project" is selected by the user, the window manager 231 displays a core selection window 304. The user selects the core 0 or 1 with which the source program is to be associated.

The association of a source program with a core may be automatically performed. For example, in the case where the cores 0 and 1 operate on different OS's, a source program is automatically associated with the core whose OS supports the source program.

After the source program is associated with the core, the core identifier 231a of the editor 230 identifies the selected core, and the color correlator 231b correlates the core color of the identified core with the source program. The core identifier 213a of the manager 210 also identifies the selected core (Step S17).

Then, the frame 305 of the editing window 302, for example, is displayed in the core color (Step S18).

On identifying the selected core, the core identifier 213a of the manager 210 updates the project folder associated with the selected core. The window manager 231 then displays the updated project folder on the display 105a (Step S19).

Figure 8:
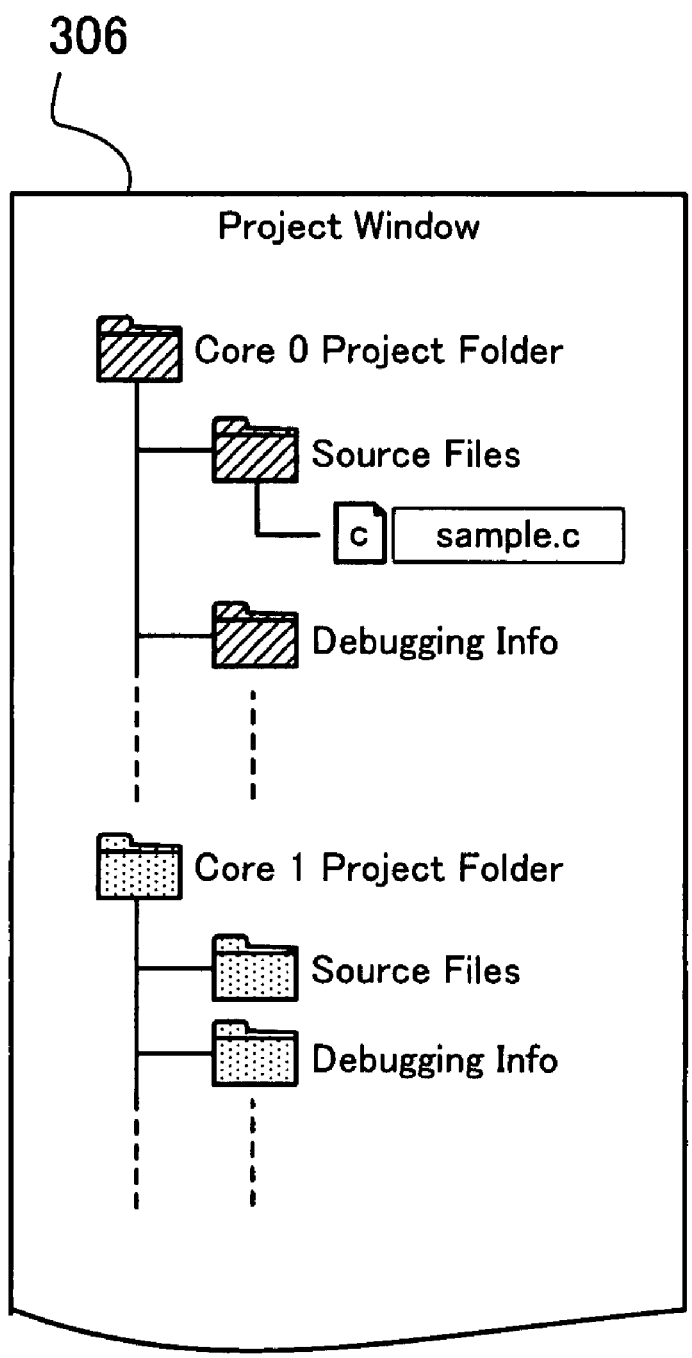
FIG. 8 shows a project window indicating a registered source program.

FIG. 8 shows the project window indicating a registered source program.

Where the source program "sample.c" has been associated with the core 0, for example, the project window 306 shows the source program registered in the "Source Files" folder under the core 0 project folder, as illustrated.

After the source program is registered under the project, the project file is updated (Step S20). If an additional project or source program is to be created or registered, Step S10 and the following steps are executed; if not, the project/source program creation process is ended (Step S21).

The above process makes it easy for the user to determine on the display 105a the core with which the project information or source program as the software development information is associated, thus mitigating troublesomeness involved in the development of software for a multi-core processor.

The following describes in detail the debugging process (Step S3) shown in FIG. 4.

Figure 9:
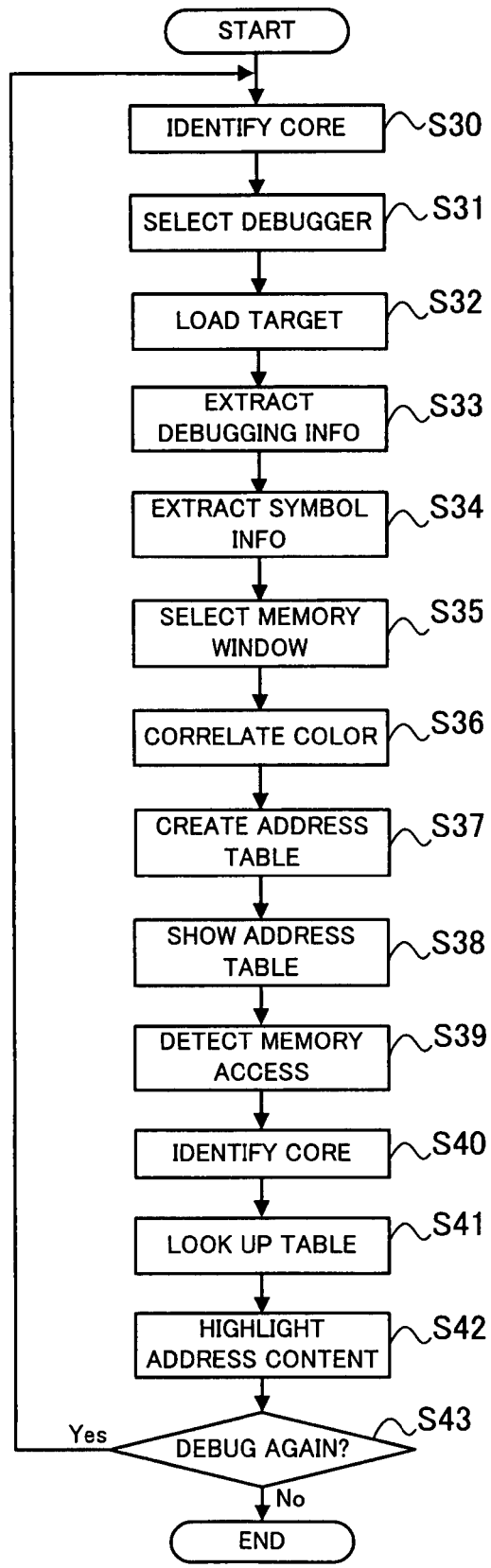
FIG. 9 is a flowchart showing a debugging process.

FIG. 9 is a flowchart illustrating the debugging process.

After a target file for a core is generated in Step S2 of FIG. 4, the core identifier 224a of the debugger controller 220 identifies the core with which the target file is associated (Step S30). Subsequently, the debugger manager 221 selects a debugger from among the emulator 240, the simulator 250, and the monitor 260 (Step S31).

The selected debugger loads the target file (Step S32), then extracts various debugging information from the target file (Step S33), and also extracts symbol information (Step S34).

For example, in the case where memory window information is selected as the debugging information by the user (Step S35), the color correlator 224b of the debugger controller 220 correlates the core color of the identified core with the memory window information (Step S36). Subsequently, the debugging data manager 233 creates a core-based address table on the basis of the memory window information (Step S37).

FIG. 10 shows an example of the core 1 address table.

As illustrated, the core number, addresses and data are registered in the address table. A similar address table is also created for the core 0.

Then, based on the address table created as shown in FIG. 10, the window manager 224 displays the address table, as a memory window, on the display 105a (Step S38).

Figure 11:
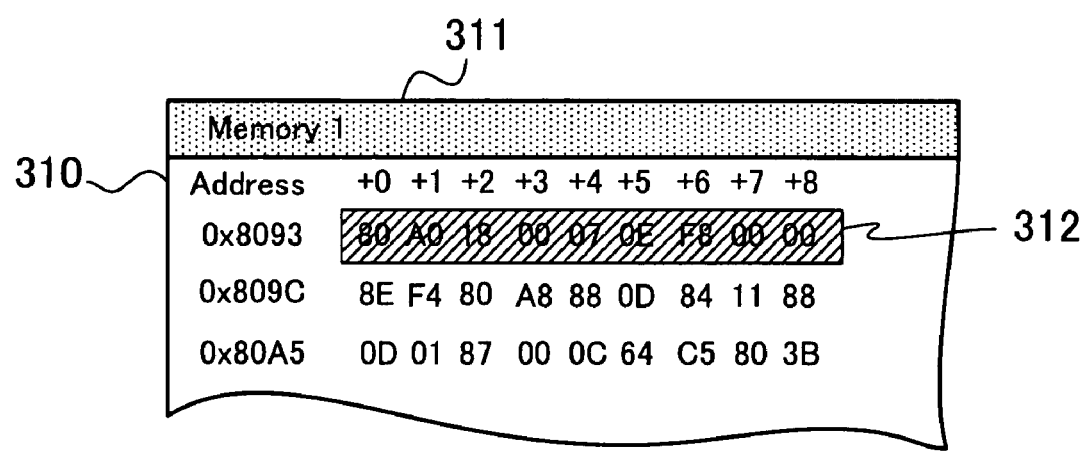
FIG. 11 exemplifies a memory window shown on a display.

FIG. 11 exemplifies the memory window shown on the display.

Since red and green have been set as the core colors of the cores 0 and 1, respectively, by the core color setter 213b, the frame 311 of the memory window 310, which is displayed based on the address table of FIG. 10, is shown in green.

Subsequently, the run/break manager 222 of the debugger controller 220 executes the debugger and detects memory access by the cores (Step S39).

The core identifier 224a identifies the core that accessed memory (Step S40). Then, looking up the address table (Step S41), the window manager 224 highlights the address content (in FIG. 11, region 312) by using the core color correlated with the core that accessed memory, for example, by using red if the core 0 accessed memory (Step S42). This makes it easy to determine which core has accessed memory.

If it is found as a result of the debugging that modification of the program is needed, the program is modified and then debugged again; if the program need not be debugged again, the process is ended (Step S43).

In the following, a debugging process for setting breakpoints will be described with reference to the flowchart of FIG. 12.

First, a debugger is started (Step S50). In this step, Steps S30 to S34 shown in FIG. 9 are executed. Then, a breakpoint is set in accordance with the user's input operation (Step S51).

After the breakpoint is set, the debugging data manager 223 registers the breakpoint in association with the corresponding core (Step S52).

FIG. 13 exemplifies registered breakpoints.

As illustrated, the core number, the address, the name of the source program and the line in the source program are registered so as to specify the location of the set breakpoint.

Subsequently, the debugger is executed by the run/break manager 222 (Step S53). At this time, a program counter (PC) associated with each core starts counting.

The run/break manager 222 then determines whether or not the PC value has reached a breakpoint (Step S54). If a breakpoint is not reached yet, the process returns to Step S53 to continue the execution of the debugger; if a breakpoint is reached, the run/break manager suspends the execution of the debugger (Step S55).

When the execution of the debugger is interrupted, the window manager 224 identifies, by means of the core identifier 224a, the core with which the debugging information is associated (Step S56a), and shows a core-based debugging window (also called disassembling window) on the display 105a (Step S56).

Figure 14:
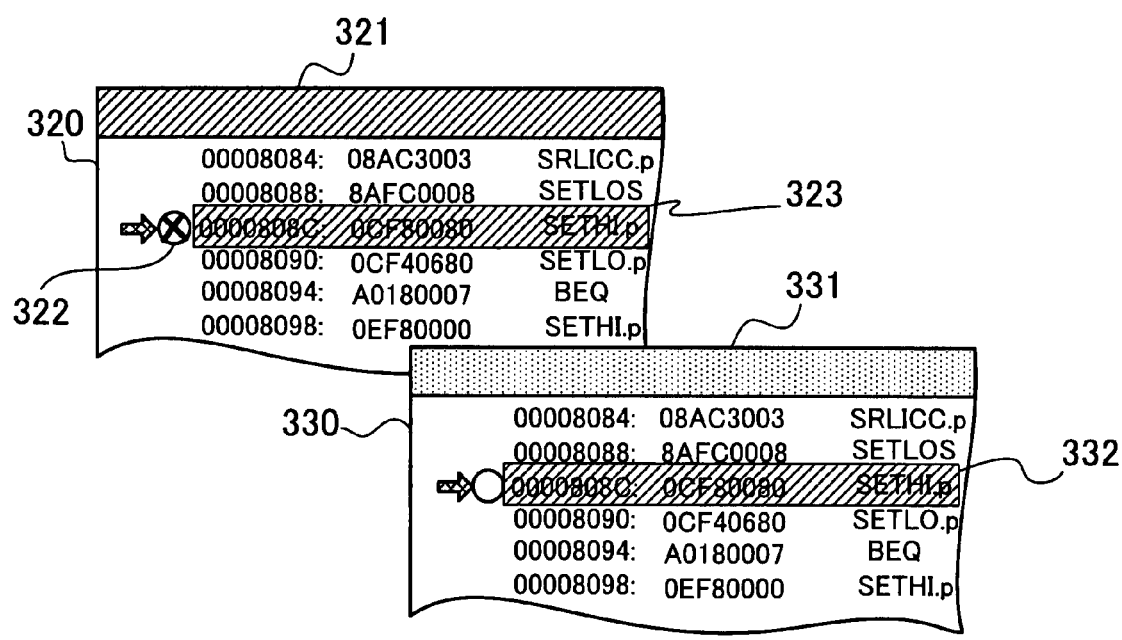
FIG. 14 exemplifies debugging windows associated with respective cores.

FIG. 14 exemplifies the core-based debugging windows.

The frame 321 of the debugging window 320 associated with the core 0 is shown in red, which is the core color of the core 0, by the color correlator 224b (Step S56b). Also, the line 323 where the program has been interrupted by the breakpoint 322 associated with the core 0 is shown in red (Step S56c).

On the other hand, the frame 331 of the debugging window 330 associated with the core 1 is shown in green, which is the core color of the core 1, by the color correlator 224b (Step S56b). Further, the line 332 where the program associated with the core 1 has been interrupted because of the breakpoint 322 set with respect to the core 0 is shown in red, which is the core color of the core 0 (Step S56c). By viewing the display 105a, therefore, it is possible to confirm with ease that the run instruction of the core 1 has stopped as a result of the breakpoint 322 set with respect to the core 0.

Figure 12:
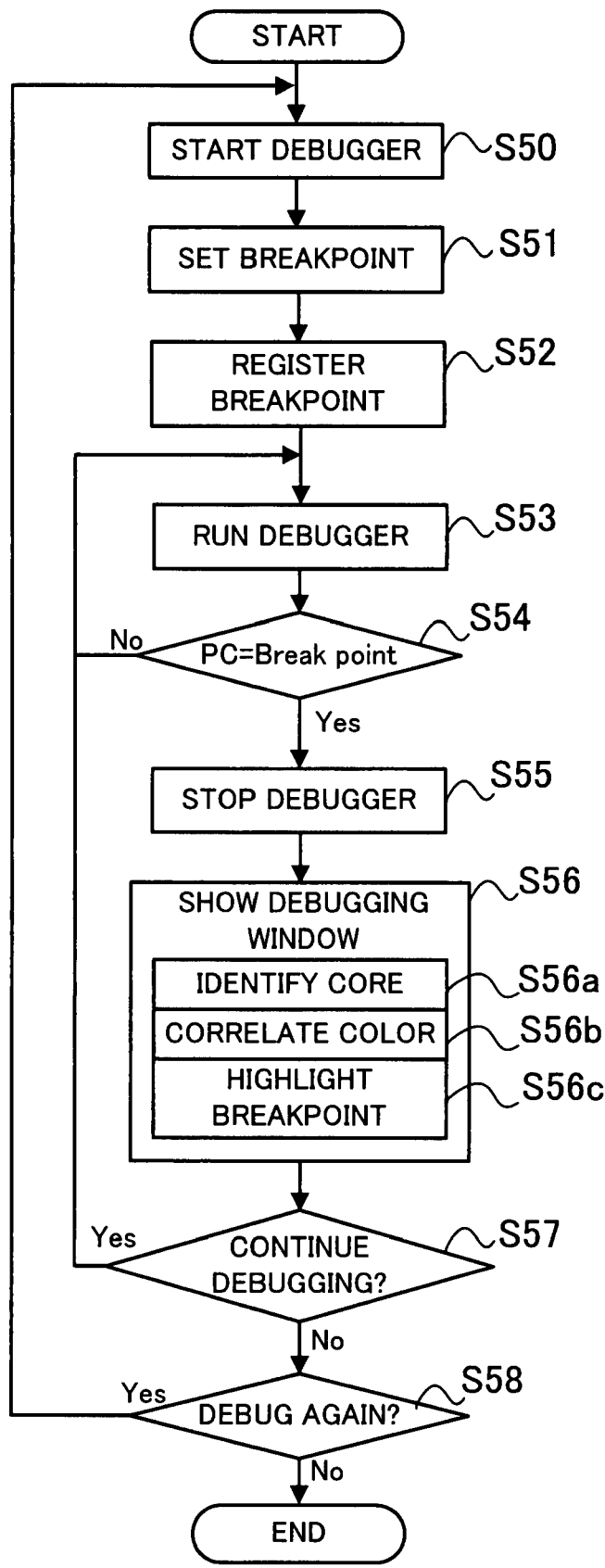
FIG. 12 is a flowchart showing a debugging process for setting breakpoints.

The processes shown in FIGS. 9 and 12 make it easy for the user to confirm on the display 105a with which core the debugging information or the breakpoint is associated, thereby mitigating troublesomeness involved in the development of software for a multi-core processor.

The performance measurement (Step S4) in FIG. 4 will be now described in detail.

Figure 15:
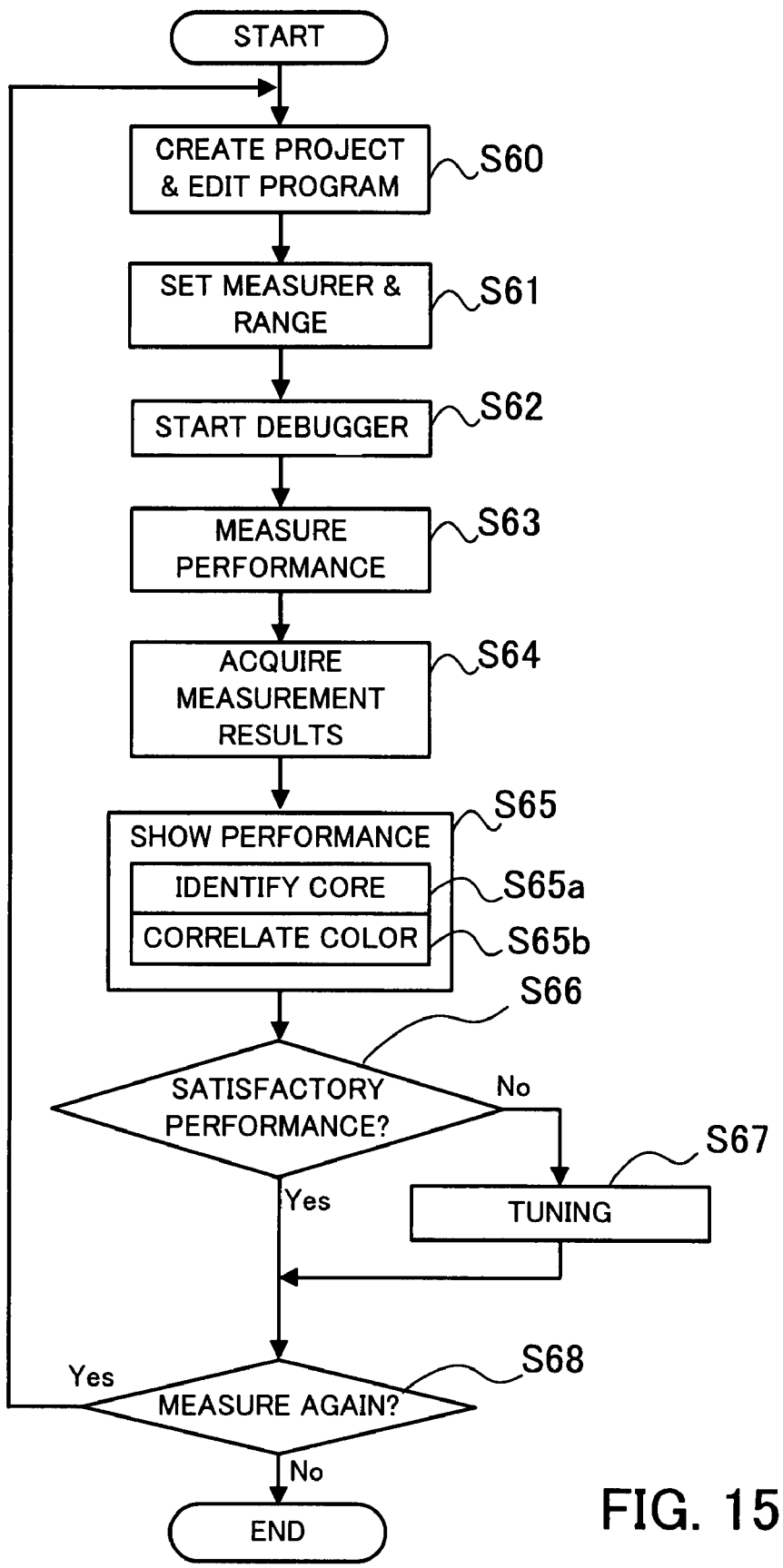
FIG. 15 is a flowchart showing a performance measurement process.

FIG. 15 is a flowchart showing the performance measurement process.

First, following the procedure as shown in FIG. 5, projects are created and source programs are edited (Step S60). Subsequently, the measurement type manager 271 selects a measurer for measuring performance, from among the profiler, the sampler, the coverage, the PA, etc., and the measurement controller 272 sets a measurement range by specifying the start and end positions of measurement (Step S61). For example, where the sampler is selected as the measurer, the measurement controller 272 embeds sampler measurement functions in the source program.

Subsequently, a debugger is started (Step S62). In this step, Steps S30 to S34 shown in FIG. 9 are executed to identify a core as the target of measurement (or allow the user to select a core).

Then, using the measurer selected in Step S61, performance of the selected core is measured (Step S63).

The measurement data manager 273 acquires the performance measurement results (Step S64).

FIG. 16 exemplifies the measurement results obtained by the sampler.

As illustrated, the measurement data manager 273 acquires the core number, the names of functions executed, and the call counts and usage rates of the respective functions.

The window manager 274 then displays the acquired performance information (Step S65). At this time, the core identifier 274a of the window manager 274 identifies the selected core (Step S65a), and the performance information of the core 0 is shown in red while the performance information of the core 1 is shown in green, as correlated by the color correlator 274b (Step S65b).

Figure 17:
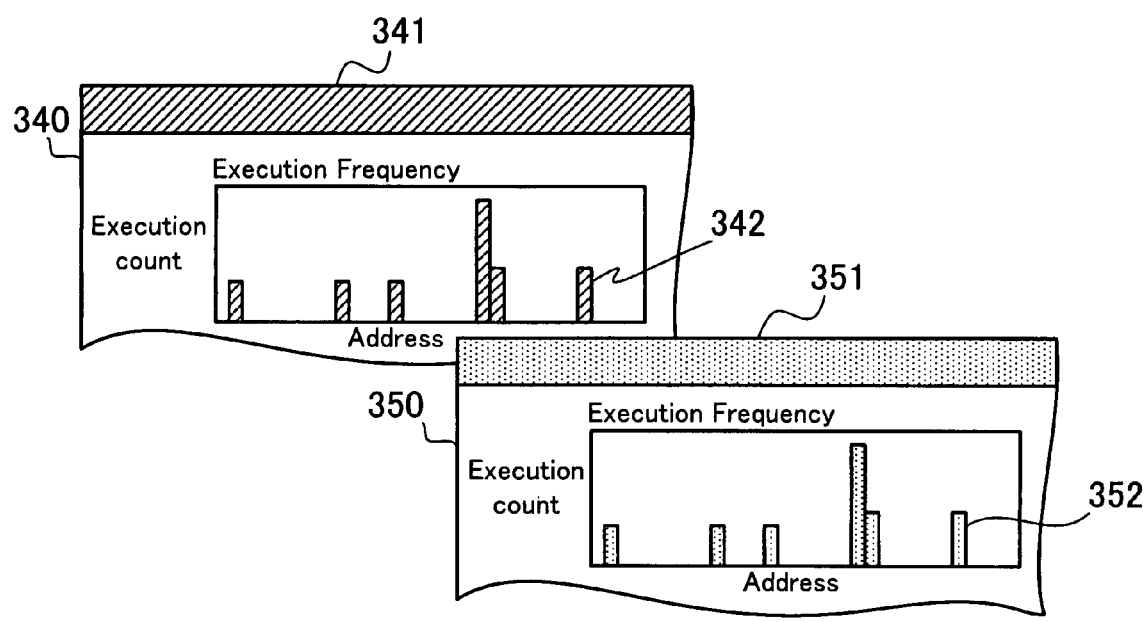
FIG. 17 shows an example of how sampler measurement results are displayed.

FIG. 17 shows an example of how the sampler measurement results are displayed.

In the core 0 performance information window 340, the frame 341 and the performance information (sampler measurement results) 342 are shown in red. In the core 1 performance information window 350, on the other hand, the frame 351 and the performance information 352 are shown in green.

Subsequently, it is determined whether or not the measured performance is at a satisfactory level (Step S66). If the performance is not satisfactory, the program is adjusted (tuned) (Step S67), and it is determined whether to measure the performance again (Step S68). Also when the measured performance is satisfactory, it is determined whether to measure the performance again. If the performance is to be measured again, Step S60 and the following steps are executed; if not, the process is ended.

The above process enables the user to easily confirm on the display 105a with which core the measured performance information is associated, whereby troublesomeness involved in the development of software for a multi-core processor is lessened.

The task analysis will be now described.

Figure 18:
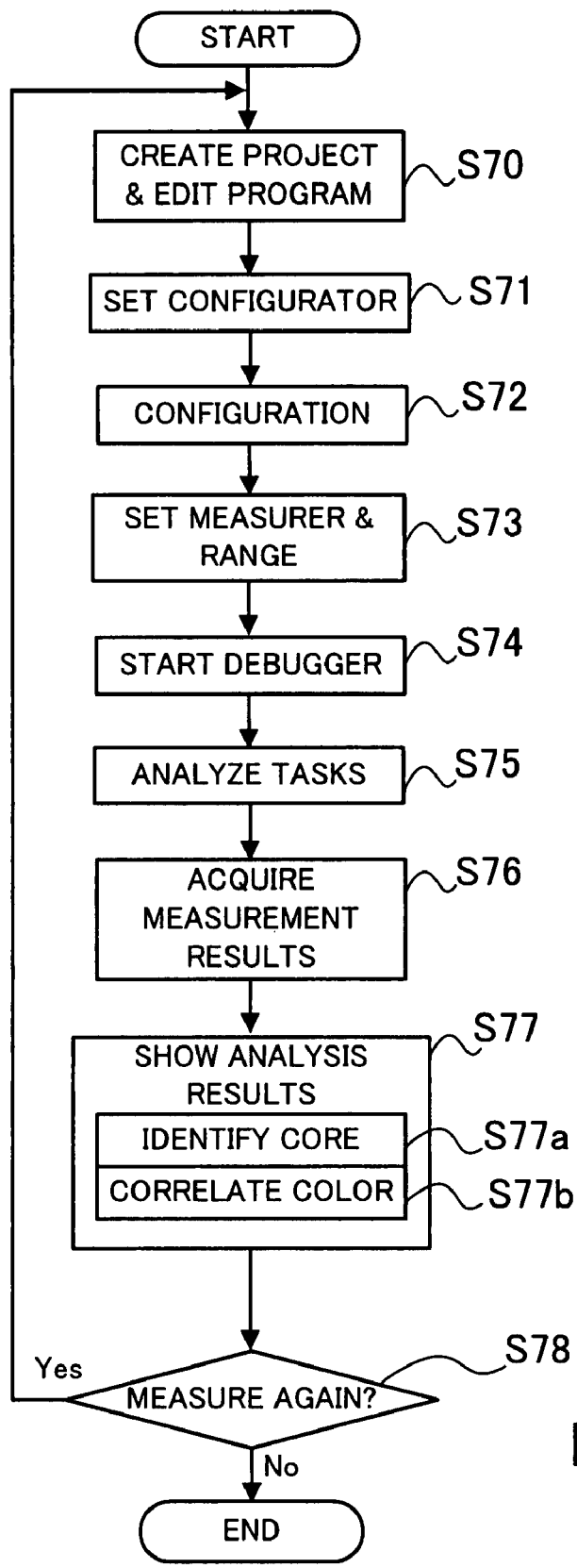
FIG. 18 is a flowchart showing a task analysis process.

FIG. 18 is a flowchart showing the task analysis process.

First, following the procedure as shown in FIG. 5, projects are created and source programs are edited (Step S70). Subsequently, a configurator is set and priority levels of tasks are set, followed by various settings of the OS, handler, etc. (Step S71).

Then, configuration is executed and the OS, kernel and application are built (Step S72).

The measurement type manager 271 selects the OS analyzer, the measurement controller 272 sets a measurement range by specifying the start and end positions of measurement (Step S73), and the debugger is started (Step S74). In Step S74, Steps S30 to S34 shown in FIG. 9 are executed to identify a core as the target of measurement (or allow the user to select a core).

Then, with respect to the selected core, the OS analyzer analyzes and measures, by means of a hook routine in the OS, task transition states of the application run on the OS (Step S75).

The measurement data manager 273 acquires the measurement data and generates a task list or the like (Step S76).

The window manager 274 then displays the acquired task analysis results (Step S77). At this time, the core identifier 274a of the window manager 274 identifies the selected core (Step S77a), and the tasks of the core 0 are shown in red while the tasks of the core 1 are shown in green, as correlated by the color correlator 274b (Step S77b).

FIG. 19 shows an example of how the task analysis results are displayed.

A task analysis result display window 360 shows task information such as the IDs and priority levels of tasks, and these items of information are shown using the core colors correlated by the color correlator 274b.

Specifically, task information 361 of the core 0 is highlighted using red, while task information 362 of the core 1 is highlighted using green.

Finally, it is determined whether to perform the measurement again (Step S78). If the measurement is to be performed again, Step S70 and the subsequent steps are executed; if not, the process is ended.

The above process enables the user to visually confirm with ease the balance of tasks allotted to the individual cores, thereby mitigating the labor required of the user in adjusting the loads on the cores.

As described above, by using the technique of the embodiment in each of the software development steps shown in FIG. 4, it is possible to significantly mitigate troublesomeness involved in the development of software for a multi-core processor. For example, even in cases where there are source programs describing an identical process, the software developer can clearly identify the core with which the source program currently coded, debugged, verified, or tuned is associated. Also, since it is unnecessary for the software developer to constantly take care with which core the current work is associated while developing software, the software developer's mental fatigue can be lessened.

In the foregoing, the embodiment is described on the assumption that the multi-core processor for which software is developed has two cores, but the number of cores may be more than two. In such cases, the individual cores may be assigned their respective distinctive colors, such as yellow and blue in addition to red and green.

Also, in the above description, separate projects are created for respective cores. Alternatively, a common project for operating multiple cores may be created. In this case, a specific color for the common project may be defined.

According to the present invention, the processor core with which the software development information is associated is identified, and in accordance with the identification result, the association between the software development information and the corresponding processor core is displayed in a visually distinguishable manner. Accordingly, the user can determine with ease the processor core with which the currently handled software development information is associated, whereby troublesomeness involved in the development of software to be executed by a multi-core processor can be significantly lessened.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A software development apparatus for developing software to be executed by a multi-core processor; comprising:
   a processor core identifier for identifying one of processor cores with which software development information for developing the software is associated;
   a display processor for displaying, in accordance with an identification result, association between the software development information and the associated processor core in a visually distinguishable manner; and
   a core color setter for correlating different colors with the respective processor cores,
   wherein the display processor colors a target element corresponding to a type of the software development information associated with the processor core, in a color correlated with the processor core, and
   wherein the display processor colors debugging windows associated with the respective processor cores in different colors correlated with the respective processor cores, and colors a line of the debugging window where a program associated with one processor core has been interrupted because of a breakpoint set with respect to another processor core, in a color correlated with said another processor core.

2. The software development apparatus according to claim 1, wherein the software development information is project information.

3. The software development apparatus according to claim 1, wherein the software development information is program development support information.

4. The software development apparatus according to claim 1, wherein the software development information is debugging information.

5. The software development apparatus according to claim 3, wherein the program development support information is performance information.

6. The software development apparatus according to claim 3, wherein the program development support information is task information.

7. A software development method for developing software to be executed by a multi-core processor, comprising:
   identifying one of processor cores with which software development information for developing the software is associated;
   displaying, in accordance with an identification result, association between the software development information and the associated processor core in a visually distinguishable manner; and
   correlating different colors with the respective processor cores,
   wherein a target element corresponding to a type of the software development information associated with the processor core is colored in a color correlated with the processor core, and
   wherein the display processor colors debugging windows associated with the respective processor cores in different colors correlated with the respective processor cores, and colors a line of the debugging window where a program associated with one processor core has been interrupted because of a breakpoint set with respect to another processor core, in a color correlated with said another processor core.

* * * * *